United States Patent
Biver et al.

(10) Patent No.: US 9,001,410 B2
(45) Date of Patent: Apr. 7, 2015

(54) PROCESS FOR MANUFACTURING AN ELECTROCHROMIC ARTICLE

(75) Inventors: Claudine Biver, Charenton-le-pont (FR); Sandrine Duluard, Charenton-le-pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 42 days.

(21) Appl. No.: 13/817,394

(22) PCT Filed: Aug. 16, 2011

(86) PCT No.: PCT/FR2011/051917
§ 371 (c)(1),
(2), (4) Date: Feb. 15, 2013

(87) PCT Pub. No.: WO2012/022912
PCT Pub. Date: Feb. 23, 2012

(65) Prior Publication Data
US 2013/0142945 A1 Jun. 6, 2013

(30) Foreign Application Priority Data
Aug. 17, 2010 (FR) ...................................... 10 56627

(51) Int. Cl.
*G02F 1/01* (2006.01)
*G02F 1/15* (2006.01)
*C09K 9/00* (2006.01)
*G02F 1/153* (2006.01)
*C23C 18/16* (2006.01)

(52) U.S. Cl.
CPC ... *G02F 1/15* (2013.01); *C09K 9/00* (2013.01); *G02F 1/1533* (2013.01); *C23C 18/16* (2013.01); *G02F 2202/36* (2013.01)

(58) Field of Classification Search
CPC ........ C23C 18/52; C23C 18/40; C23C 18/34; C23C 18/32; C23C 18/1692; C23C 18/1648; C23C 18/1644; C23C 18/1603; C23C 22/53; C23C 22/52; C23C 22/50; C23C 22/24; C23C 22/05; C23C 22/02; C23C 18/16; G02F 1/155; G02F 2202/16; G02F 2202/06; G02F 1/15; G02F 1/1533; G02F 2202/36; C09K 9/00

USPC .................................. 359/237, 238, 240, 265
See application file for complete search history.

(56) References Cited

U.S. PATENT DOCUMENTS

| | | | |
|---|---|---|---|
| 4,938,571 A | 7/1990 | Cogan et al. | |
| 6,178,034 B1 * | 1/2001 | Allemand et al. | ............ 359/265 |
| 2010/0165440 A1 | 7/2010 | Nguyen et al. | |
| 2011/0070361 A1 | 3/2011 | Duluard et al. | |

FOREIGN PATENT DOCUMENTS

FR 2960558 A1 12/2011

OTHER PUBLICATIONS

J. J. García-Jareño, D. Benito, J. Navarro-Laboulais, and F. Vicente, Electrochemical Behavior of Electrodeposited Prussian Blue Films on ITO Electrodes, vol. 75 No. 7 Jul. 1998 • Journal of Chemical Education.*
Monk P., Mortimer R., Rosseinsky D. Electrochromism and electrochromic devices, Monk P., Mortimer R., Rosseinsky D. Electrochromism and electrochromic devices, 2003, pp. 11,12, 26, 27, 139, 318.*

* cited by examiner

*Primary Examiner* — Gordon R Baldwin
*Assistant Examiner* — Mohammad Mayy
(74) *Attorney, Agent, or Firm* — Seed IP Law Group PLLC

(57) ABSTRACT

The present invention relates to a process for manufacturing an electrochromic article, comprising the following successive steps: (a) deposition of a layer of an electrochromic compound on the surface of a transparent or translucent electroconductive substrate; (b) deposition of a redox agent, which is a reducing agent or an oxidizing agent for the electrochromic compound, on the layer of electrochromic compound at a multitude of discrete points or areas thereon; (c) bringing the layer of electrochromic compound, deposited in step (a), and the redox agent, deposited in step (b), into contact with a liquid electrolyte for a time long enough to allow the electrochromic compound to be reduced or oxidized by the redox agent; and (d) elimination of the electrolyte by rinsing and/or drying, the layer of electrochromic compound being a porous layer of open porosity and/or an electrically conductive layer.

15 Claims, No Drawings

PROCESS FOR MANUFACTURING AN ELECTROCHROMIC ARTICLE

The present invention relates to a process for manufacturing an electrochromic article, comprising a step of non-electrolytic reduction or oxidation of an electrochromic coating.

The studies that have led to the present application received funding from the Seventh Framework Program of the European Commission under the grant agreement No. INNOSHADE-200431-NMP LARGE.

Electrochromic glazing units typically have a structure comprising:
- two transparent outer layers, for example two sheets of organic or mineral glass,
- two electrically conductive layers deposited on the inner faces of the outer layers and connected to a power supply,
- an electrolyte placed between the two electrically conductive layers, at the center of said device, and
- an electrochromic layer arranged between the electrolyte and at least one of the electrically conductive layers, and preferably between the electrolyte and the two electrically conductive layers. The electrochromic dyes of the two electrochromic layers are then chosen so that one of them is colored in the reduced state and colorless or weakly colored in the oxidized state, whereas the other is colored in the oxidized state and colorless or weakly colored in the reduced state.

In such an electrochromic device containing two electrochromic substances, one of the two will be in the oxidized state when the other is in the reduced state and vice versa. It is therefore necessary that before assembling the various elements, one of the two electrochromic layers is in reduced form and the other in oxidized form.

The deposition of a thin layer of at least one electrochromic compound on an electrically conductive substrate is carried out for example by electrodeposition or by a non-electrolytic route according to known techniques.

However, most of the electrochromic coatings deposited thus in the form of a thin layer are in the oxidized state and must consequently undergo a reduction before integration into an electrochromic device as described above.

Such a reduction is typically carried out:
- either by immersion in a solution of a reducing agent: this method suffers however from a very low storage stability of the solution of the reducing agent and requires an additional step of rinsing of the film in order to remove the residual reducing agent,
- or in an electrochemical cell: the electrically conductive layer bearing the coating of electrochromic compound to be reduced is then connected to a first electrode (working electrode) and the assembly is immersed in a bath of electrolyte in which a counterelectrode is also submerged, generally a sacrificial counterelectrode containing a reducing agent for the electrochromic compound and optionally a reference electrode.

Such an electrochemical system having two or three electrodes is relatively complex and requires an adaptation of the geometry of the various components, in particular of the dimensions of the bath, to the size of the part to be treated. It is often inappropriate, in particular when the size of the surfaces to be reduced becomes very large, as is the case for example for electrochromic windows, or when these surfaces are curved. It is not particularly suitable either for continuous reduction processes. Furthermore, with such an electrochemical system, it is difficult to obtain, beyond a certain size of the coating to be reduced, a homogeneous reduction over the whole of the surface.

The objective of the present invention has been to propose a process for reducing coatings of electrochromic compounds, deposited on electrically conductive substrates (referred to hereinbelow equally as conductive substrates, electrically conductive layers or conductive layers), which would make it possible both to do away with the problems of adapting the sizes of the electrochemical apparatus to the size of the object to be reduced and to enable electrochromic coatings to be obtained that are reduced homogeneously over large areas. In addition, this process must advantageously be able to be carried out in continuous mode, for example over long strips bearing electrochromic coatings.

The process developed by the applicant makes it possible to solve, with simple and inexpensive means, all of these problems.

Although the process proposed is particularly useful for reducing electrochromic compounds deposited in the oxidized state, it will readily be understood on reading the description below that it can be adapted very easily to the oxidation of coatings which are in the reduced state and the invention consequently covers these two cases, the reduction of a coating of electrochromic compound in the oxidized state being simply a preferred embodiment of the process of the invention.

The operating principle of the process of the present invention essentially consists in replacing the two electrodes of the device for electrolytic reduction with a sufficient quantity of a redox agent (reducing agent or oxidizing agent) deposited on the electrochromic coating, preferably in a multitude of points or regions which are spread sparsely.

In French patent application no. 1054070, the Applicant has described a process for manufacturing an electrochromic article in which a redox agent is deposited "adjacent" to the electrochromic coating, namely on a region of the electrically conductive substrate not covered by the coating of the electrochromic compound. When the assembly formed by the coating of electrochromic compound, the electrically conductive substrate and the redox agent is then brought into contact with a liquid electrolyte, an indirect redox reaction takes place, via the subjacent conductive layer, between the redox agent and the electrochromic compound that are deposited thereon. The electrochromic compound, in contact with the surface of the conductive substrate, is reduced or oxidized homogeneously even in the regions where it has not been directly in contact with the redox agent. This process has the drawback of requiring the deposition of the compound in the form of a "pattern" leaving free at least one portion of the electrically conductive substrate, which is intended to receive the redox agent.

It would therefore be useful to have a process of reduction, or of oxidation, similar to that described in the aforementioned application, but which could be carried out on an electrochromic coating covering the entire surface of the conductive substrate. It will be readily understood that, in order for such a process to work, it is necessary for the redox agent, deposited on the electrochromic coating, to be in electrical contact with the subjacent electrically conductive substrate so as to guarantee a good transfer of the electrons involved in the redox reaction. The present invention is based on the idea that such an electrical contact between the redox agent and the conductive substrate can be obtained by virtue of the choice of an electron-conductive electrochromic coating and/or of a porous electrochromic coating.

The subject of the present invention is consequently a process for manufacturing an electrochromic article comprising the following successive steps:

(a) the deposition of a layer of an electrochromic compound on the surface of a transparent or translucent electrically conductive substrate, (b) the deposition of a redox agent which is a reducing agent or an oxidizing agent for the electrochromic compound, on the layer of electrochromic compound in a multitude of discrete regions or points of said layer, (c) the contacting of the layer of electrochromic compound, deposited in step (a), and of the redox agent, deposited in step (b), with a liquid electrolyte for a sufficient time to enable the reduction or the oxidation of the electrochromic compound by the redox agent, and (d) the removal of the electrolyte by rinsing and/or drying, the layer of electrochromic compound being a porous layer with open porosity and/or an electrically conductive layer.

The compound deposited in step (a) may in principle be any electrochromic compound. Among the known electrochromic compounds, those for which one of the two coloration states is a essentially colorless state are particularly preferred.

Mention may be made, as examples of such electrochromic compounds, of hexacyanometallates such as the hexacyanoferrates of iron (for example, Prussian blue), vanadium, ruthenium, cadmium, chromium, palladium or platinum, $WO_3$, $V_2O_5$ and NiO. Use may also be made of electrochromic polymers such as poly(3,4-ethylenedioxythiophene) (PEDOT) which is essentially transparent and colorless in the oxidized state and is of blue color in the reduced state. Finally, although viologens such as alkylviologens, arylviologens or alkylarylviologens are not particularly suitable as such, the polymers thereof, polyviologens, form good quality electrochomic layers.

Preferred electrochromic compounds which may be mentioned are hexacyanometallates, in particular hexacyanometallates of iron, such as Prussian blue, and conductive polymers, in particular PEDOT.

The list of electrochromic dyes above does not however have any limiting character and the process of the present invention will be able to be adapted in principle to any electrochromic compound not appearing in this list, on the condition that it has sufficient adhesion to the subjacent conductive substrate, that it is insoluble in the liquid electrolyte and that a suitable redox agent is used.

In step (a) of the process according to the invention, the electrochromic compound is deposited in the form of a thin coating on the surface of a transparent electrically conductive substrate.

This electrochromic coating must be porous with an open porosity sufficient to allow the permeation of the redox agent down to the electrically conductive substrate, and/or have an electron conductivity.

Some of the electrochromic compounds, for example PEDOT, spontaneously give rise to a porous coating. For others, in particular inorganic electrochromic compounds, it is necessary to incorporate into the coating known pore-forming agents which can be removed from the finished coating for example by washing or heating. The use of pore-forming agents is particularly easy for depositions carried out via a wet route (for example by spin coating, coating, inkjet printing). Some gaseous deposition techniques such as chemical vapor deposition (CVD), optionally plasma-enhanced, or physical vapor deposition (PVD), optionally plasma-enhanced, make it possible to obtain porous electrochromic coatings without the use of pore-forming agents.

Mention may be made, as examples of pore-forming agents, of cationic surfactants such as surfactants containing a quaternary ammonium group or nonionic surfactants such as block polymers with hydrophilic and hydrophobic blocks, the surfactant properties of which lead to a nanostructuring of the coatings. Block copolymers based on ethylene oxide and propylene oxide sold under the name Pluronic® are perfectly suitable for the creation of nanoscale channels within the electrochromic coatings.

Some of the electrochromic compounds listed above have an intrinsic conductivity. This is the case, for example, for PEDOT and polyviologens, which are conductive polymers, and for $WO_3$, which is an inorganic semiconductor. When it is desired to use electrochromic compounds that are not electron conductors, it is of course necessary to incorporate into the electrochromic coating an agent capable of giving it a certain conductivity. Use will preferably be made of the transparent conductive materials described below that are used for the subjacent electrically conductive substrate. These conductive materials are incorporated into the electrochromic coating in proportions of between 1% and 20% by weight, preferably in an amount of from 2% to 10% by weight, relative to the total weight of the electrochromic coating.

The thickness of the electrochromic coating does not generally exceed a thickness of 10 micrometers and is preferably between 100 and 1000 nm.

In the art, a certain number of organic or mineral transparent conductive materials are known. The mineral materials most widely used are transparent conductive oxides known under the abbreviation TCO, among which mention may be made of the derivatives of tin oxide, of indium oxide or of zinc oxide. Mention may in particular be made of fluorine-doped tin oxide (FTO, fluorine tin oxide), tin-doped indium oxide (ITO, indium tin oxide), antimony-doped tin oxide and aluminum-doped zinc oxide. Tin-doped indium oxide (ITO) is particularly preferred.

Use may also be made of electrically conductive organic polymers such as polyacetylenes, polypyrrols, polythiophenes, polyanilines, poly(p-phenylene sulfide), poly(p-phenylene vinylene). A well-known transparent electrically conductive polymer is poly(3,4-ethylenedioxythiophene) (PEDOT).

The electrically conductive substrate is generally a transparent or translucent electrically conductive layer formed on a non-conductive support. This layer then preferably has a thickness between 50 nm and 10 000 nm, in particular between 100 and 600 nm.

The non-conductive support is of course also preferably transparent or translucent.

It may be a substrate made of mineral glass or else a transparent organic material, for example made of polyethylene terephthalate, polycarbonate, polyamide, polyimide, polysulfones, polymethyl methacrylate, copolymers of ethylene terephthalate and of carbonate, polyolefins, in particular polynorbornenes, homopolymers and copolymers of diethylene glycol bis(allyl carbonate), (meth)acrylic homopolymers and copolymers, in particular the (meth)acrylic homopolymers and copolymers derived from bisphenol-A, thio(meth)acrylic homopolymers and copolymers, homopolymers and copolymers of urethane and of thiourethane, epoxide homopolymers and copolymers and episulfide homopolymers and copolymers.

The non-conductive support may in particular be a relatively flexible material, for example a plasticized or unplasticized polymer, preferably having a glass transition temperature above 60° C., enabling the deposition of the electrochromic compound by rotary printing and the continuous reduction or oxidation of the electrochromic material according to the process of the present invention.

The electrochromic compound is deposited at least on one portion of the surface, preferably on the entire surface of the electrically conductive support.

As indicated in the introduction, the redox agent is preferably a reducing agent. The nature of the reducing agent is not a determining factor for the present invention on the condition that this reducing agent is sufficiently insoluble in the liquid electrolyte so as not to be removed from the surface of the electrically conductive substrate before having fulfilled its role that consists in reducing the electrochromic dye. Mention may be made, by way of example of reducing agents that can be used, of nickel (Ni), molybdenum (Mo), copper (Cu), cobalt (Co), indium (In), iron (Fe), zinc (Zn), silicon (Si), silver (Ag), titanium (Ti), aluminum (Al), all these metals preferably being in the metallic state. Use will preferably be made of Cu, Ni, Ag, Ti and Al.

The redox agent is preferably deposited in a multitude of points or regions on the layer of electrochromic compound. These points or regions may be deposited at random, but are preferably arranged in an ordered manner, at a regular distance from one another. It may be for example a set of fine lines or points, a grid pattern, a regular alignment of patterns, etc.

When the redox agent, after having given away or accepted electrons, becomes soluble in the liquid electrolyte and is eliminated from the surface of the electrochromic layer, the size and arrangement of the points or regions has, of course, little importance. On the other hand, when the redox agent is not solubilized but remains on the electrochromic layer after having reacted, it is generally preferable for it to be barely visible or invisible to the naked eye. Preferably, the ratio of the surface area covered by the redox agent to the total surface area of the electrochromic layer is less than 5%, in particular less than 3% and in particular less than 1%.

It is also possible to envisage the deposition of the redox agent in a region which will then be cut out and absent from the finished article. In this case, the geometry of the deposition has, for obvious reasons, much less importance.

The amount of redox agent to be deposited depends of course on the size but also on the thickness of the electrochromic coating that is to be reduced. The reducing agent in effect functions as a "reservoir" of electrons that are available, via the electrically conductive substrate, for the reduction of the electrochromic dye. A person skilled in the art will know how to determine, without any problem, the amount needed in order to obtain the desired reduction of the electrochromic coating.

When the electrochromic layer is a layer with open porosity, the redox agent is deposited in a way that enables its penetration into the porous network and the direct contact with the subjacent electrically conductive support. Use will be made, for example, of a not very viscous dispersion of very fine metallic particles in a suitable solvent. The mean size of the particles will of course have to be significantly smaller than the mean diameter of the pores of the electrochromic coating, i.e. be between 5 nm and 500 nm. The solvent is preferably eliminated by evaporation before carrying out the following step.

After accomplishing steps (a) and (b), the substrate bearing the electrochromic coating and the redox agent deposited on the electrochromic coating is brought into contact with the liquid electrolyte, preferably by immersion or by spraying with the liquid electrolyte.

The liquid electrolyte may be an aqueous or non-aqueous solution generally, but not systematically, containing a salt. The non-aqueous solvents used may be organic solvents such as propylene carbonate, ethylene carbonate or dimethyl sulfoxide or else ionic liquids. As salts that can be used mention may be made, for example, of lithium perchlorate, tetrabutylammonium perchlorate and potassium chloride.

The bringing into contact with the liquid electrolyte may take place at ambient temperature, that is to say at a temperature between 15 and 25° C., or else at higher temperatures which will only be limited in principle by the thermal degradation of the system.

The contacting time depends on a certain number of factors such as the temperature of the electrolyte, the thickness of the electrochromic layer, the conductivity of the conductive layer, the size of the surface to be reduced and also the rate of the redox reaction. The applicant has observed that for electrochromic layer thicknesses such as indicated above, a contacting time between 30 seconds and 15 minutes, preferably between 1 minute and 8 minutes, is generally sufficient.

EXAMPLE

Deposited on a transparent support made of polyethylene terephthalate comprising a coating made of tin-doped indium oxide (ITO) having a thickness of 250 nm, is a layer of PEDOT about 200 mm in thickness over a surface area of 4 $cm^2$. After dispersing copper nanoparticles in ethanol (3% by weight of Cu relative to the mixture), one drop of the dispersion is deposited onto the PEDOT over a surface area of approximately 0.5 $cm^2$ and the ethanol is evaporated by heating at 70° C. for 20 minutes. The assembly is then immersed in a solution of tetrabutylammonium perchlorate ($TBAClO_4$) in propylene carbonate (1M). The deposit of PEDOT then adopts, over its entire area, a blue coloration which no longer changes after around one minute. The electrochromic article obtained in this manner is finally withdrawn from the solution, rinsed and dried.

The invention claimed is:

1. A process for manufacturing an electrochromic article comprising the following successive steps:
    (a) depositing a layer of electrochromic compound on a surface of a transparent or translucent electrically conductive substrate,
    (b) depositing a redox agent, which is a reducing agent or an oxidizing agent for the electrochromic compound, on the layer of electrochromic compound,
    (c) contacting the layer of electrochromic compound, deposited in step (a), and the redox agent, deposited in step (b), with a liquid electrolyte for a sufficient time to enable reduction or oxidation of the electrochromic compound by the redox agent, and
    (d) removing the electrolyte by rinsing and/or drying,
    the layer of electrochromic compound being a porous layer with open porosity and/or an electrically conductive layer.

2. The process as claimed in claim 1, wherein the redox agent is deposited in a multitude of points or regions on the layer of electrochromic compound.

3. The process as claimed in claim 1, wherein a ratio of a surface area covered by the redox agent to a total surface area of the electrochromic layer is less than 5%.

4. The process as claimed in claim 1, wherein the redox agent is a reducing agent for the electrochromic compound.

5. The process as claimed in claim 1, wherein the electrically conductive substrate includes at least one of tin-doped indium oxide (ITO), tin-doped fluorine oxide (FTO), and conductive organic polymers.

6. The process as claimed in claim 1, wherein the reducing agent is chosen from the group consisting of metallic states of Ni, Mo, Cu, Co, In, Fe, Zn, Si, Ag, Ti, and Al.

7. The process as claimed in claim 1, wherein the electrochromic compound includes a hexacyanometallate.

8. The process as claimed in claim 1, wherein the contacting in step (c) is carried out by immersion in the liquid electrolyte or by spraying of the liquid electrolyte.

9. The process as claimed in claim 1, wherein the contacting in step (c) occurs for a contacting time of between 30 seconds and 15 minutes.

10. The process as claimed in claim 3, wherein the ratio of the surface area covered by the redox agent to the total surface area of the electrochromic layer is less than 1%.

11. The process as claimed in claim 6, wherein the reducing agent is chosen from the group consisting of Cu, Ni, Ag, Ti and Al.

12. The process as claimed in claim 7, wherein the electrochromic compound includes an iron hexametallate.

13. The process as claimed in claim 7, wherein the electrochromic compound includes Prussian blue.

14. The process as claimed in claim 1, wherein the electrochromic compound includes a conductive polymer.

15. The process as claimed in claim 9, wherein the contacting time, in step (c), is between 1 minute and 8 minutes.

* * * * *